United States Patent Office 3,723,352
Patented Mar. 27, 1973

3,723,352
SUPPORTED SILVER CATALYSTS
Warner Alexander, Brookhaven, and James E. McEvoy, Springfield, Pa., assignors to Air Products and Chemicals, Inc., Philadelphia, Pa.
No Drawing. Filed Jan. 25, 1971, Ser. No. 109,640
Int. Cl. B01j 11/40
U.S. Cl. 252—454                     3 Claims

ABSTRACT OF THE DISCLOSURE

A solution of thermally decomposable salt of silver and a gold salt solution are impregnated into a foamed calcium sodium aluminodisilicate support and calcined to provide a supported silver catalyst containing a trace amount of gold, said catalyst having effectiveness in the synthesis of ethylene oxide.

BACKGROUND OF THE INVENTION

Field of invention

This invention relates to catalysts having a crystalline aluminosilicate support and Group I-B components as the active components, the aluminosilicate containing calcium and sodium compounds.

Prior art

One of the methods of preparing ethylene oxide is by the oxidation of ethylene over a catalyst consisting of silver on alpha alumina. Although silica and other materials have at times been proposed as supports for silver catalysts, the general preference through the decades has been for an alpha alumina support.

Perlite and vermiculite have been converted to inorganic foam materials by thermal treatment of hydrated minerals. A great variety of inorganic foams have been utilized to some extent for purposes of insulation, but generally have been unsuited for use as the support for a catalyst.

SUMMARY OF THE INVENTION

In accordance with the present invention, a foamed calcium sodium aluminodisilicate prepared by the thermal recrystallization of a calcium sodium Zeolite A is employed as the support for silver in a catalyst for the oxidation of ethylene to ethylene oxide. The silver is deposited by impregnation of a solution of a thermally decomposable salt of silver into the foamed calcium sodium aluminodisilicate, followed by drying and thermal decomposition of the anion of the silver salt.

DESCRIPTION OF EMBODIMENTS

The invention is further clarified by reference to a plurality of examples.

Examples 1–11

Meta kaolin powder is refluxed with 10% aqueous sodium hydroxide in accordance with Kumins et al. 2,544,695, and the recovered dry powder is compressed into zeolite pellets consisting essentially of sodium alumino disilicate. These pellets are ion-exchanged with a solution of calcium chloride to provide calcium sodium alumino disilicate pellets. Measurable amounts of sodium remain in the product because of the conventional incompleteness of routine procedures for ion exchange of crystalline zeolites. Synthetic zeolites are generally identified by the cation occupying most of the ion exchange sites without referring to less abundant cations. As mol percent of ion exchange capacity, the pellets are about 51–90% Ca and about 10–49% $Na_2O$, desirably at least 70% Ca. Said pellets of calcium sodium alumino disilicate are heated during about 30 minutes to about 1100° C. and maintained at about 1100° C. for about 10 minutes to provide ceramic foam particles. Each foamed particle has a volume of approximately four times the volume of the initial calcium sodium alumino disilicate pellet. The foamed calcium sodium alumino disilicate pellets contain the same ratio of Ca to Na ions as the pellets before heating. The foamed pellets have a bulk density of from about 8 to 19 lbs./ft.$^3$ or about 0.13 g./cc. to about 0.3 g./cc. The surface area is approximately 2 m.$^2$/g. The pore size distribution shows about 67% of the pore volume consists of pores so large that they are measured in microns instead of in angstroms. Most of the pores are of a size in the 7 to 30 micron range. The pore volume is about 5 cc./g., or about 10 times that of some alumina carriers. When the foam pellet is heated for 24 hours at about 1090° C., the shrinkage is only 0.3% and when the same 24 hours test is evaluated at a still higher temperature of 1260° C., the shrinkage is of the magnitude of 0.6%. The crushing strength of the pellets is about 10 lbs. The particles have a specific heat of about 0.224 B.t.u./lb.

An oxidation catalyst was prepared from the foamed pellets. The pellets were impregnated with a small amount of gold chloride and dried. Then a concentrated solution of silver nitrate was impregnated into the pellets. The molar ratio of deposited silver to gold was about 51 to 1.

The impregnated catalyst was treated with an aqueous solution of sodium hydroxide, thereby converting the silver nitrate to a hydrated silver oxide. The pellets were washed with water to remove conveniently removable sodium hydroxide and nitrate ion. Some of the silver and gold may have been removed by the water-washing. The pellets were dried at 110° C. and had an ignition loss at 500° F. of 12.1%. The sodium oxide content of the pellets was 2.3%, the silver content was 33.7% and the gold content was 1.2%. Thus the silver to gold mol ratio was 51 to 1. The catalyst was heated in a stream of hydrogen at about 300° C. to volatilize the residual nitrate and moisture content of the catalyst and to assure the formation of high surface area metallic silver and gold. The thus reduced catalyst was treated with nitrogen to flush out sorbed hydrogen and then with dry air at about 300° C. to provide high surface area silver oxide on the ceramic foam support. The density of the thus impregnated catalyst was higher than the density of the ceramic foam by reason of such silver oxide.

TABLE I.—TEST RESULTS FOR ETHYLENE OXIDE CATALYST

| Example | Reactor temperature, °F. | Reactor pressure, p.s.i.g. | GHSV | Mole percent conversion | Mole percent selection | Mole percent EO in effluent | Weight EO/hr./ Weight Ag. |
|---|---|---|---|---|---|---|---|
| 1 | 500 | 150 | 3,800 | 1.8 | 72 | 0.065 | |
| 2 | 580 | 150 | 3,800 | 13.1 | 59 | 0.39 | |
| 3 | 480 | 150 | 3,800 | 56.6 | 23 | 0.65 | 0.42 |
| 4 | 487 | 150 | 3,400 | 36.7 | 68 | 1.25 | 0.74 |
| 5 | 493 | 150 | 3,200 | 40.6 | 66 | 1.34 | 0.75 |
| 6 | 488 | 150 | 900 | 57.4 | 57 | 1.64 | 0.25 |
| 7 | 453 | 150 | 1,400 | 35.6 | 66 | 1.17 | |
| 8 | 453 | 100 | 1,100 | 33.5 | 69 | 1.16 | |
| 9 | 454 | 100 | 1,100 | 35.1 | 66 | 1.16 | |
| 10 | 455 | 100 | 3,400 | 20.5 | 70 | 0.72 | |
| 11 | 476 | 100 | 1,000 | 42.7 | 62 | 1.32 | |

The catalyst was employed in a reactor utilizing about 4 cc. of the catalyst (1.3 g.). The once-through reactant stream contained 5% ethylene, 9% oxygen, 86% nitrogen, and 0.2 part per million of ethylenedichloride. Each change of process conditions was deemed the starting of a different example. The effluent gases were analyzed by chromatographic techniques. No recycle stream was utilized. The results of the evaluation are summarized in Table I.

It is noted that the previously described catalyst consists of a major amount of crystalline calcium sodium aluminodisilicate foam matrix, and a minor amount (e.g. 33.7%) silver, and a trace amount (e.g. 1.2%) of gold, so that the silver to gold atom ratio is about 50 (e.g. 51.5).

Example 12

A supply of catalyst support pellets was prepared by converting pellets of calcium Zeolite A to ceramic foam particles by heating at about 1050° C. for about 20 minutes following the procedure of Example 1. A series of oxidation catalysts is prepared by impregnating silver nitrate into the ceramic foam pellet, impregnating an amount of gold which is about 2 mol percent the amount of silver to maintain a Ag/Au atom ratio of about 50, and heating the impregnated pellet in a stream of $H_2$ at about 300° C. to decompose the nitrate ion and thus provide a catalyst consisting of a minor amount of silver and a trace amount of gold in a matrix of calcium sodium aluminodisilicate foam. Concentration ranges from about 1% to about 40% silver activated by gold for maintaining the Ag/Au ratio of about 50 have utility as supported silver catalysts.

By a series of tests it is established that the foamed matrix particle, prior to incorporation of the catalytic metal component, must consist essentially, of non-zeolitic synthetic calcium sodium aluminodisilicate, the proportions being 50–90% CaO and 10–50 $Na_2O$ per mole of alumina in the aluminodisilicate, said calcium sodium aluminodisilicate having a bulk density of less than 0.3 kilogram per liter and having structural strength and rigidity, said calcium sodium aluminodisilicate comprising a plurality of uniformly distributed interconnected open pores contributing a porosity of at least 75 volume percent, the pores having diameters from about 5 to about 30 microns contributing about 75% of the porosity, said calcium sodium aluminodisilicate having a surface area of less than about 5 square meters per gram, and an initial fusion temperature of at least 1250° C.

The foamed calcium sodium aluminodisilicate was pulverized and the powder subjected to standard X-ray diffraction procedures to provide the following data:

TABLE A

| d, A.: | $I/I_o$ |
|---|---|
| 8.63 | 12 |
| 4.98 | 19 |
| 4.31 | 16 |
| 4.19 | 33 |
| 4.04 | 23 |
| 3.85 | 51 |
| 3.76 | 16 |
| 3.63 | 14 |
| 3.36 | 14 |
| 3.26 | 65 |
| 3.19 | 100 |
| 3.13 | 16 |
| 3.04 | 19 |
| 3.00 | 70 |
| 2.88 | 30 |
| 2.57 | 19 |
| 2.51 | 14 |
| 2.30 | 26 |
| 2.14 | 14 |
| 2.09 | 21 |
| 2.08 | 19 |

Such X-ray data suggest either a mixture possibly comprising nepheline, plageoclase, and anothite, or possibly a unique single crystalline species having no name other than foamed calcium sodium aluminodisilicate.

What is claimed is:

1. The method of preparing a supported silver catalyst, which method includes the steps of:
    preparing Zeolite A type of sodium aluminodisilicate subjecting said sodium aluminodisilicate to ion exchange with a solution of a calcium salt to prepare calcium sodium aluminodisilicate, said calcium sodium aluminodisilicate being of granular particle size and corresponding to the composition

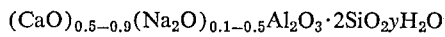
    $(CaO)_{0.5-0.9}(Na_2O)_{0.1-0.5}Al_2O_3 \cdot 2SiO_2 y H_2O$ converting granular particles of said calcium sodium aluminodisilicate to porous granular particles of foamed crystalline calcium sodium aluminodisilicate by heating at a temperature within the range of 850° C. to 1200° C. for a time of at least 10 minutes;
    impregnating the foamed granular particles with a liquid solution of a gold salt and with a liquid solution of a silver salt having a thermally decomposable anion, the amount of silver impregnated into the particles being in the range of about 1 to about 40% by weight and the gold being in an amount such that the atomic ratio of silver to gold is about 50:1;
    heating the impregnated particles in a glass stream at conditions decomposing the thermally decomposable anion to bond the gold and the silver to the particle, thereby providing a trace amount of gold and said amount of siliver distributed throughout the foamed crystalline calcium sodium aluminodisilicate support;
    and cooling the granular particles.
    and cooling the granular particles.

2. A supported silver catalyst comprising silver in an amount of about 1 to about 40% by weight and an amount of gold such that the atomic ratio of silver to gold in the catalyst is about 50 to 1 distributed throughout a low density non-zeolitic crystalline synthetic calcium sodium aluminodisilicate foam, the proportions being 50–90% CaO and 10–50% $Na_2O$ per mole of alumina in the aluminodisilicate, said calcium sodium aluminodisilicate foam support having a bulk density of less than about 0.3 kilogram per liter and having structural strength and rigidity, said calcium sodium aluminodisilicate foam comprising a plurality of uniformly distributed interconnected open pores contributing a porosity of at least 75 volume percent, the pores having diameters from about 5 to about 30 microns contributing about 75% of the porosity, said calcium sodium aluminodisilicate foam having a surface of less than about 5 square meters per grams, and an initial fusion temperature of at least 1250° C.

3. The catalyst of claim 2 in which the presence of the calcium sodium aluminodisilicate foam is evidenced by an X-ray diffraction essentially corresponding to Table A.

References Cited

UNITED STATES PATENTS

| | | | |
|---|---|---|---|
| 3,396,112 | 8/1968 | Burrows | 252—382 X |
| 3,440,181 | 4/1969 | Olstowski | 252—62 |
| 3,497,455 | 2/1970 | Ahr | 252—62 |
| 3,585,217 | 6/1971 | Titzenthaler | 260—348.5 |
| 3,594,310 | 7/1971 | Pollitzer | 252—455 Z |

CARL F. DEES, Primary Examiner

U.S. Cl. X.R.

252—455 R, 455 Z